Figure 1:
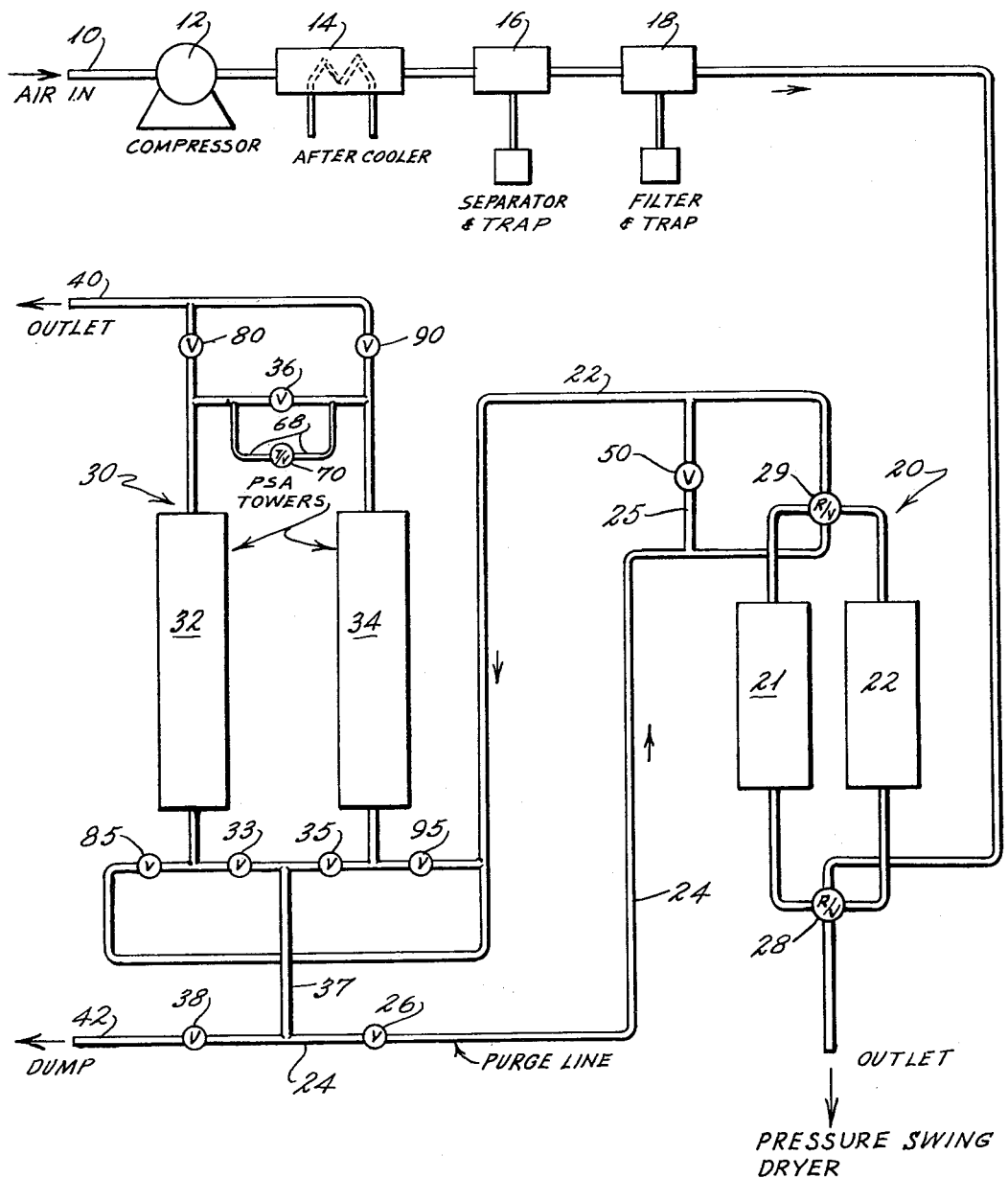

United States Patent [19]

Frey et al.

[11] 4,439,213
[45] Mar. 27, 1984

[54] NITROGEN GENERATION SYSTEM

[75] Inventors: Bill Frey, Ellicott City; Mark Haynie, Glen Burnie; John Psaras, Arnold, all of Md.

[73] Assignee: The C. M. Kemp Manufacturing Co., Glen Burnie, Md.

[21] Appl. No.: 334,463

[22] Filed: Dec. 30, 1981

[51] Int. Cl.³ .............................................. B01D 53/04
[52] U.S. Cl. ............................................ 55/31; 55/33; 55/58; 55/62; 55/75; 55/179; 55/389
[58] Field of Search .................... 55/25, 26, 31, 33, 58, 55/62, 75, 179, 387, 389

[56] References Cited

U.S. PATENT DOCUMENTS

| | | | |
|---|---|---|---|
| 3,140,931 | 7/1964 | McRobbie | 55/25 |
| 3,225,516 | 12/1965 | Smith et al. | 55/25 |
| 3,533,221 | 10/1970 | Tamura | 55/33 |
| 3,594,984 | 7/1971 | Toyama et al. | 55/33 |
| 3,801,513 | 4/1974 | Munzner et al. | 55/75 X |
| 3,891,411 | 6/1975 | Meyer | 55/26 |
| 3,923,477 | 12/1975 | Armond et al. | 55/25 |
| 3,957,463 | 5/1976 | Drissel et al. | 55/25 |
| 3,967,464 | 7/1976 | Cormier et al. | 55/62 X |
| 4,011,065 | 3/1977 | Munzner et al. | 55/25 |
| 4,015,956 | 4/1977 | Munzner et al. | 55/25 |
| 4,249,915 | 2/1981 | Sircar et al. | 55/26 |
| 4,256,469 | 3/1981 | Leitgeb | 55/25 |
| 4,264,339 | 4/1981 | Juntgen et al. | 55/25 |
| 4,264,340 | 4/1981 | Sircar et al. | 55/33 X |
| 4,314,828 | 2/1982 | Saito et al. | 55/26 |
| 4,329,158 | 5/1982 | Sircar | 55/26 |
| 4,348,213 | 9/1982 | Armond | 55/25 |

*Primary Examiner*—Robert H. Spitzer
*Attorney, Agent, or Firm*—Fidelman, Wolffe & Waldron

[57] ABSTRACT

A PSA (pressure swing adsorber) system for producing high purity nitrogen from compressed air containing a pressure swing dryer to dry the compressed air arranged for regeneration by oxygen enriched desorption effluent gasses from the PSA towers.

A product nitrogen purge assists in desorption of the PSA towers and leads to improved yield.

The system is characterized by capability for yields of 99.5% nitrogen plus argon to exceed about 25% and an efficiency of about 60 volumes of the 99.5% product per volume of adsorbent per hour.

4 Claims, 3 Drawing Figures

NITROGEN GENERATION SYSTEM

INTRODUCTION

This invention relates to a method and apparatus for generating high purity nitrogen, high purity nitrogen being herein defined as a gas containing at least 95% by volume of nitrogen and argon. More particularly, this invention relates to a process and apparatus for recovering high purity nitrogen gas from air by adsorption techniques.

BACKGROUND OF THE INVENTION

The art has long recognized that adsorbents are capable of distinguishing between the diverse molecules present in air and therefore, that with appropriate molecular sieves, and adsorption and desorption techniques, air can be fractionated. Reference is made to U.S. Pat. Nos. 4,011,065 and 4,015,956 for detailed discussion to the separation of air into an oxygen enriched stream and a nitrogen enriched stream through the use of carbon molecular sieve (solid phase) adsorbents arranged in a multitower reversing system of the pressure swing type, with the individual towers being operated cyclically through an adsorption cycle and a desorption cycle.

By and large, pressure swing adsorption systems (PSA) employed to fractionate air into a high purity nitrogen stream and an oxygen enriched (dump) stream, have heretofore largely ignored the presence of the several minor constituents in air, including notably argon and water vapor. The argon largely ends up in the nitrogen stream. The water vapor ends up in the oxygen stream.

In particular, the water vapor content of air has been ignored for reason that the nitrogen product stream is dry. The water vapor is adsorbed by the carbon molecular sieve adsorbent during the adsorption cycle along with the oxygen and then is desorbed along with the oxygen during the purge or regeneration of the adsorbent in the course of the desorption cycle. Indeed, presence of water vapor in the feed air has been ignored to such an extent by the art that discussions of the PSA nitrogen systems in the literature alternatively suggest a self-contained PSA add-on to existing plants (without any water vapor control), or solely because such is cheaper, the use of plant compressed air (which sometimes is dried after compression) if the PSA system will be part of a new plant. However, ignoring the water vapor content of the feed air has significantly reduced efficiency of the PSA high purity nitrogen process because presence of water vapor in the air stream is in fact much more disadvantageous than the art has recognized heretofore.

Thus, it has been discovered by the inventors hereof, that drying of the air prior to entry into the PSA towers is desirable. Drying the compressed air by a solid desiccant pressure swing air dryer integrated operationally with the pressure swing adsorber of a PSA high purity nitrogen separation system is particularly advantageous.

In addition, it has been discovered by the inventors hereof that passage of high purity nitrogen back into the PSA tower being regenerated for purge purposes is most advantageous. Insofar as the inventors hereof are aware the PSA art has not appreciated the desirability of using a purge gas.

BRIEF STATEMENT OF THE INVENTION

The high purity nitrogen recovery system according to the present invention provides for compressing air, then cooling and condensed water is removed, whereafter the air passes through a pressure swing dryer suitably of known state-of-the-art construction, but modified for regeneration of the dryer towers by the oxygen enriched dump gas, after which the air passes into the pressure swing adsorbers (PSA) to produce high purity nitrogen gas and an oxygen enriched dump stream of gas. A bleed stream of less than about 30% of the nitrogen product is employed for purge in the PSA towers. Purge gases along with the oxygen enriched dump gas is used for regeneration purposes in the pressure swing air dryer.

DESCRIPTION OF THE INVENTION

Figure 2:
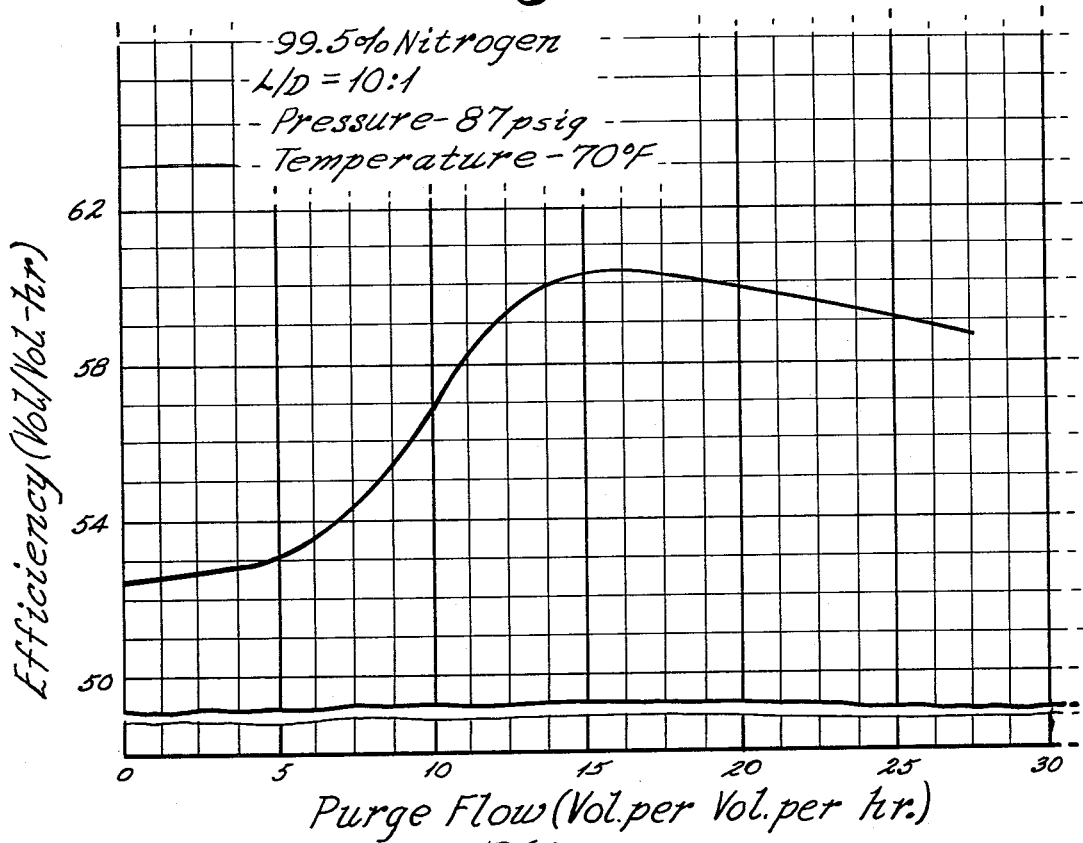
Figure 3:
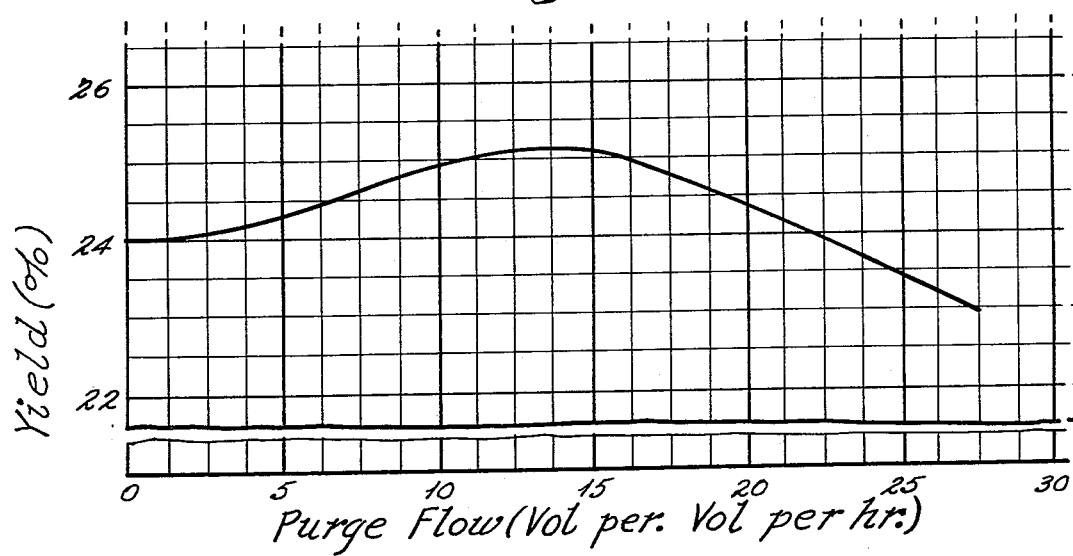

For further discussion of the details of the invention and its rationale, reference is now made to the attached drawing wherein:

FIG. 1 is a flow sheet disclosing the process and equipment of the present invention, and FIGS. 2 and 3 are graphs showing how a nitrogen bleed stream purge assist to the desorption of the PSA towers improves both yield (FIG. 3) and efficiency (FIG. 2)

Referring now to FIG. 1 of the drawing it may be seen that an air stream 10 enters an oil free compressor 12 to be compressed therein, after which the air passes through an aftercooler 14 to remove the heat of compression and heat of condensation, then to separator 16 to take out the moisture condensed in aftercooler 14, where after the air is filtered at filter 18, following which the air is passed through the solid dessicant in a pressure swing twin tower dryer 20. The dryer 20 is schematically illustrated with only those connections essential for flow sheet illustration being shown. Pressure swing type solid dessicant dryer systems are state-of-the-art and, therefore, need not be illustrated or described in detail.

The dryer 20 reduces water vapor in the compressed air from a normal level of about 10,000 parts per million to about a −40° C. dew point which is 15–20 parts per million, both by volume.

The dried compressed air from the pressure swing dryer 20 passes via line 22 into PSA 30 (pressure swing adsorber) constructed for producing high purity nitrogen with, again, only the details of the PSA essential for flow sheet illustration of this invention being shown in the drawing. PSA (pressure swing adsorber) nitrogen generators are state-of-the-art systems (e.g., from Bergbau-Forschung GMBH) and may for example, be the system disclosed in the aforementioned U.S. Pat. Nos. 4,011,065 and 4,015,956 arranged so as to produce high purity nitrogen. In any event, the high purity nitrogen which still is under superatmospheric pressure passes to outlet 40 as the desired product of the system.

A minor but effective proportion of the nitrogen product (i.e., not more than 30%) leaving whichever tower is in the adsorption cycle phase, for example tower 32, bleeds off by way of bypass line 68 and valve 70, and after being reduced in pressure enters the top of other tower (34) as a purge stream. Valve 70 may, for example, be a throttling valve. The purge gas, ordinarily amounting to 15–25% of the total nitrogen is thus passed back through the tower undergoing regeneration in the desorption cycle phase, such being illustrated in the drawing as tower 34 and in its passage therethrough, the purge gas desorbs oxygen from the carbon molecular sieve inside tower 34, and forces out of the tower the (oxygen enriched) gas that had been inside the tower void space. The purged gas flow from tower 34 may be passed out of the system by way of valve 35, line 37 and valve 38 to the dump outlet 42. Depending on the setting of valves 38 and 26, some or all of this (oxygen enriched) purged gas flow is sent by way of purge gas line 24, to the pressure swing dryer 20 by way of repressurization (reversing) valve 29 to regenerate whichever tower, e.g., dryer tower 21, is undergoing regeneration, serving to regenerate the desiccant bed of that tower for later reuse to dry air. The dryer regenerating gas then leaves the dryer 20 by way of repressurization (reversing) valve 28 to be dumped. In the phase of the drying cycle illustrated in FIG. 1 of the drawing, dryer tower 23 is operated in the drying mode and PSA tower 32 of the nitrogen separation system is operated in the nitrogen separation mode while PSA tower 34 and dryer tower 21 are respectively in the desorption cycle phase and the regeneration cycle phase with the beds therein being rejuvenated.

Ordinarily, pressure swing dryers are provided with a bleed line cross-connecting the twin towers thereof to provide gas for regenerating the desiccant. In practice of this invention, however, no such bleed line is employed, since desorption gas and purged gas from PSA towers 32 and 34 is employed for regeneration of the dryer towers 21 and 23. A conventional four-way reversing valve arrangement may be used for valves 28 and 29. A valved crossover line 25 connecting high pressure air line 22 and purge line 24 is used to repressurize the dryer tower after regeneration thereof has been completed. At that time valve 50 is opened, valve 26 is closed, then when the tower reaches line pressure reversing valves 28, 29 switch the dryer towers, and valve 50 is closed, valve 26 is opened.

Thus, to repeat, the system of the present invention employs a pressure swing dryer ahead of a PSA high purity nitrogen generator to remove the water vapor in the compressed air supply feed for the nitrogen separator, the dryer being regenerated by PSA dump gas.

As can be seen in FIG. 1 of the drawing, dump or blow down oxygen enriched desorption gas and purged gas from the pressure swing nitrogen separating towers is directed back to dryer system 20 to provide the low pressure gas flow necessary for periodic regeneration of the desiccant in the pressure swing dryer towers. This PSA dump gas has been enriched in oxygen but that factor is of no consequence with regard to operation of a pressure swing dryer. What is of consequence to the operation of dryer 20 is the absence of water vapor in the dump gas, so that PSA dump gas is ideal for regeneration purposes in a pressure swing dryer. (Ordinarily, 15–20% of the compressed air passed through a pressure swing dryer must be employed in the dryer for desiccant regeneration purposes.) In essence then, the energy usage attributable to the pressure swing dryer is nominal, being the pressure drop loss of gas passage to and through the dryer 20, and the power to activate solenoids and other additional electrical controls in the dryer system. This capability for using dump gas from the PSA nitrogen recovery system for regeneration purposes in the pressure swing dryer reduces energy costs per cfm of nitrogen product compared to using wet air.

RATIONALE OF THE INVENTION

A. THE AIR DRYER

The extent to which water is a detriment in the PSA system for producing high purity nitrogen is believed to have escaped the attention of the art, for reason apparently that the water adsorbs and desorbs with the oxygen, and also, for reason that removing the 1% or so by volume water vapor from saturated incoming air and thereby proportionately increasing the nitrogen and oxygen contents offers expectation of only a nominal improvement in nitrogen purity or yield, and a detriment i.e., capital and energy for the dryer.

Other considerations exist however, and these considerations make absence of water vapor in the air stream to the PSA quite significant, particularly for production of a 99.5% nitrogen and argon product. Any water adsorbed by the carbon molecular sieve must be desorbed, of course, along with the oxygen during the desorption cycle of the PSA nitrogen generator. However, in the instance of fresh (i.e., new) adsorbent, the carbon containing molecular sieve will adsorb the water from the air but then not quite all of the water desorbs. The water content in the adsorbent increases cycle by cycle until water content in the adsorbent equilibrates to the adsorption/desorption conditions at which the PSA is operating. The water molecules permanently retained in the carbon molecular sieve steal, so to speak, sites that otherwise would retain oxygen and as a result, the capacity of the adsorbent bed to adsorb oxygen has been equilibrated by the water content of the carbon molecular sieve to some level significantly below its potential capacity to adsorb oxygen from dry air. The difference of wet air to dry air can represent a loss of 10% in yield and in efficiency of the PSA carbon molecular sieve.

Unfortunately, no data is available to the inventors hereof on the equilibrium water content of the carbon molecular sieve adsorbent at the various temperature and pressure levels employed in PSA systems and perforce to the air separating capacity consequences of moisture. They can, however, report that their yield of 99.5% nitrogen decreased from 25% to about 22% and the efficiency decreased from about 60 v/v hr. to 53 v/v hr. in a run when the dryer 20 was nonoperational in a PSA system constructed as illustrated in FIG. 1 of the drawing, and operated at about 8 bar for adsorption, about 1 bar for desorption. Then after the PSA towers were vacuum purged and once again employed to separate dried compressed air, the yield of 99.5% nitrogen returned to a previous higher level of 25%.

The relatively low yields obtained by the inventors hereof with wet compressed air are consistent with reports made by others. For example, a paper given in October 1980 at a Linde-Symposium on Air Separation Plants (by J. Voit) describing a PSA system operated with moisture present in the compressed air reported both calculated and measured yields of 99.5% nitrogen plus argon in the range of 16–18% for both small and large PSA units. (This PSA system discharged the dump gas to atmospheric pressure.)

The detriment created by presence of water vapor in the air stream is believed to be a function of the lower of the operating pressures selected for the PSA nitrogen generator, with the detriment being greatest for high pressure PSA systems characterized by gas dump to atmospheric pressure and least for low pressure PSA systems characterized by discharge of the nitrogen product at close to atmospheric pressure (drawing off the dump gases under vacuum conditions). Accordingly, practice of this invention is most applicable to the high pressure PSA systems, and therefore, a high pressure PSA nitrogen generator coupled to a pressure swing air dryer constitutes a preferred embodiment of the invention.

B. THE PURGE GAS FLOW

As has already been indicated, the present invention includes within the practice thereof, purging the PSA towers by reverse flow passage thereinto of 5–30% of the nitrogen offtake.

Bleed line 68 and throttle valve 70 cross connect PSA towers 32 and 34 so that for example, 20% of the nitrogen offtake from the tower operating in the adsorption cycle phase bleeds top to bottom, back through the tower operating in the desorption cycle during the desorption cycle, and, of course, some or all of the purge gas from such tower may then pass through purge line 24 to the dryer tower undergoing regeneration e.g., tower 21.

Employment of a nitrogen bleed gas improves the desorption results obtained through the pressure reduction which takes place when the PSA towers are switched. This can be seen in FIG. 3 wherein zero flow of nitrogen purge is the yield obtained with only decompressive backflow of gas out of the PSA tower relied upon for desorption of the carbon molecular sieve. Also, the volume of nitrogen product per hour per cubic foot of carbon molecular sieve i.e., its efficiency, increases significantly, as can be seen from FIG. 2.

The detailed operation of the PSA towers is as follows.

Referring now again to FIG. 1, it may be seen that the flow sheet illustrates incoming air flowing through an open valve 85 through tower 32, then out by way of an open valve 80. Valves 36, 33, 90 and 95 are closed. Bleed line valve 70 is (always) open allowing the nitrogen purge to bleed therethrough, the nitrogen purge passing into the top of tower 34.

Then, when the PSA towers are switched, valves 80 and 85 are closed, valves 38 and 26 are closed, thereby cutting the PSA towers 32 and 34 off from the compressed air supply. Thereafter, valves 36 and 33 are opened; valve 35 is already open. Pressure rapidly equalizes between what had been high pressure tower 32 and low pressure tower 34 by flow of gas tower top to tower top through valve 36 and tower bottom to tower bottom through valves 35 and 33. Once pressures of towers 32 and 34 have been equalized, valves 36 and 35 are closed, then valves 95, 26 and 38 are opened, and compressed air then flows through tower 34 for separation therein. Thereafter, valve 90 is opened to draw off high purity nitrogen. Valve 38 and 26 allow the gas inside tower 32 to decompress, and pass out principally to dump line 42, with some dump gas passing into purge line 24. It should be appreciated that all valve openings and closings are sequenced so as to optimize the quality of the product being removed.

Decompression of the gas inside tower 32 and the resulting outflow of the gas therefrom causes the bulk of the desorption of oxygen and regeneration of the carbon molecular sieve adsorbent. Zero purge gas flow which represents complete reliance upon the decompression for desorption purposes, resulted in a yield of 24% (by volume of 99.5% nitrogen plus argon and a volumetric efficiency of nearly 53 volumes per hour of 99.5% $N_2$ per volume of adsorbent in the PSA system constructed as illustrated in FIG. 1. The prior art is believed to have relied only on gas outflow during decompression for desorption of the carbon molecular sieve adsorbent.

However, when some of the nitrogen offtake is flowed back through the decompressed tower, using for example, 15 volumes of nitrogen per volume of adsorbent per hour, the volumetric efficiency of the PSA system rises to more than 60 and the yield increases to a peak of more than 25%. The data as a whole, which is plotted on the graphs of FIGS. 2 and 3, demonstrates that flow of 5–20 volumes per hour of nitrogen per volume of adsorbent increases efficiency and yield significantly.

FURTHER DISCUSSION OF THE INVENTION

The system of this invention is an integrated whole. It should be appreciated that the compressed air pressure swing dryer is not simply an independent add-on to the PSA nitrogen generator. For one thing, PSA dump gas is used for regeneration purposes in the dryer, a major energy saving. Also, tower switchover in the PSA and in the dryer should be integrated so as not to coincide, as for example, by providing an overall control unit.

Pressure swing dryers available commercially such as for example, the C. M. Kemp Manufacturing Co. PS dryer series, typically operate at a five minute adsorption or desorption cycle time mode. On the other hand, the (pressure swing) reversing towers of the nitrogen recovery system including, for example, (Kemp "295 Nitrogen" TM Systems) typically operate at a one minute adsorption or desorption cycle time. Since cycle times need not be equal, no changes are contemplated in the dryer cycle time or the PSA cycle time. Desirably, a single (solid state) accurate controller should be employed to time the cycles of nitrogen separation in the PSA towers and of drying in the dryer towers so that tower switchover times do not drift into a situation wherein both a dryer tower and a nitrogen recovery tower depressurize simultaneously. Such would intensify the pressure surge through the system and would result in a longer than normal switching time span when the system as a whole produces no nitrogen product, and might cause purity of the nitrogen product to vary.

As has already been indicated, the pressure swing dryer 20 is a standard unit except for the illustrated valve and pipe modifications to supply PSA dump and purged gas as the regeneration gas and to return dry air for repressurization of the dryer tower before switchover. Thus, valve 26 is open to provide regeneration gas to the dryer tower being regenerated. Valve 50 in cross connection line 25 is closed at this time. Valve 26 closes whenever pressures in the two PSA towers are being equalized. However, valve 26 also is part of the pressure swing dryer cycle and closes (once each 5 minutes) when a dryer tower is to be repressurized. Repressurization of the dryer tower occurs upon opening valve 50 (for about 20 seconds) after which it closes again, and then valve 26 opens.

An additional complexity in the system as a whole resides in the mass flow mismatch in operation of the PSA towers and of the dryer towers, some of which can be seen from the data in FIG. 3. Thus, the yield of nitrogen from the system of the present invention is about 25%. Therefore, the balance of the air i.e., about 75%, is discarded, i.e., dumped. The surge outflow gas from decompression of the PSA tower on switchover from adsorption to desorption accounts for about 10% of the compressed inlet air. The gas desorbed after the initial surge accounts for about 60% of the compressed inlet air and the purged gas amounts to about 5%. The product of the PSA nitrogen generator is about 25% of the inlet air, which accounts for the total amount compressed inlet air. A pressure swing air dryer normally employs 15-20% of the compressed dried air for regeneration of the desiccant in the form of a steady reverse flow low pressure gas. In practice of this invention, the controls for partitioning the dump gas, desorbed gas, and purged gas through valves 38 and 26 have to be set then so that, overall, about 60-50% of the incoming air ultimately will be dumped through line 42, and about 15-25% will pass into purge line 24 to the dryer 20 for desiccant regeneration, partitioning the total outflow of discarded gas in preferably a roughly 3 to 1 ratio. This means that the pressure swing dryer receives purge gas in surge fashion at the rate of one surge a minute, five surges over the course of a five minute regeneration cycle. Between surges purged gas passed in backflow from the PSA tower, e.g., of about 15 volumes per volume of adsorbent may be passed to purge line 24 and dryer 20 in steady flow, along with enriched in oxygen air which is continuously being desorbed from the carbon molecular sieve in the same tower.

Availability of steady flow gas from the PSA towers, i.e., purged gases and gases released from the sieve subsequent to the initial surge is believed desirable for the system of this invention as a whole. Pressure swing dryers are designed for regeneration of the desiccant therein by steady flow. Passing steady flow gas to dryer 20 augmented by multiple surges has been found to be satisfactory for regenerating dryer 20, without need for expedients such as holding tanks to convert the surges of gas from the PSA into a more steady flow, or valving systems designed to prevent PSA gas surges from carrying over to dryer 20.

If desired, the depressurization surges of gas from the PSA towers could be dumped and only steady flow gas sent back through dryer 20, i.e., $\frac{1}{3}$-$\frac{1}{2}$ of the steady flow gas.

In practice of this invention, it has been found the system is not sensitive. So much discarded gas is available, about 75% of the air feed, that close (automatic) controls over the gas that passes to dryer 20 for regeneration is not needed. A rough and ready manifolding of discarded gas for about a 3 to 1 gas flow split at the connection between lines 37, 42 and 24 sends enough discarded gas (amounting to between 15-25% of the air feed) through purge line 24 and the dryer 20; the dryer towers regenerate satisfactorily. To repeat, regeneration of the desiccant in dryer 20 by a combination of surge flow and steady flow of oxygen enriched air has not been found to be detrimental to the air dryer.

One possible advantage over the prior art PSA systems that operate with moisture containing air to which only conjecture can be offered is with regard to nitrogen purity. Since removal of water vapor increases nominally the nitrogen content in the air entering the PSA towers, the expected consequence is advantageous e.g., raise nitrogen yield appropriately, and of nitrogen purity vis a vis PSA systems operating on moisture containing air.

However, in the construction and operation of the PSA towers Applicants can point out and further discuss the action of the nitrogen purge, use of which increases yield and efficiency 5-10%. The PSA towers of the present system are built with an actual preferred length to diameter ratio in the range of 3:1-15:1, and are cross-connected as has been described to provide the purge line 68 and purge valve 70. About 10-25% of the nitrogen offtake is recycled. The upper limit of nitrogen purge given above is somewhat uncertain and will depend on void volume and the L to D ratio of the PSA towers. In the 10:1 L to D ratio equipment constructed by the inventors hereof, a recycle for purge of more than 27% of the nitrogen offtake reduces efficiency (see FIG. 2), but in other tower configurations and/or carbon molecular sieves of different void volume, the upper limit for nitrogen recycle could be less than 25 or as much as 30%. Suffice it then to repeat that a minor but effective proportion of the nitrogen offtake, never more than about 30%, is returned for purge purposes to the tower being desorbed in top to bottom flow through the tower.

The data plotted on FIG. 3 indicates that nitrogen bleed in the PSA tower is believed to displace from the PSA tower gas that is enriched in oxygen. Mention has already been made that the adsorption cycle and the desorption cycle of the PSA nitrogen generator last about one minute. Since only about 60 volumes of product nitrogen per volume of adsorbent per hour are produced as product and additionally, about 15 volumes of nitrogen offtake are recycled for purge flow (see FIG. 2) the compressed high purity nitrogen taken from a PSA tower is only about 2.0 vol/vol of adsorbent per cycle, based upon standard conditions (SCFM).

This means that operation of the adsorber tower e.g., tower 32, can be conceived roughly as an intermittent operation whereon the tower is completely filled up with compressed gas then some of the gas is removed as nitrogen, being replaced with (compressed) dry air, whereupon the adsorption cycle ends. Thereafter when pressure between the PSA towers 32 and 34 are equalized, some gas from the top of tower 32 flows through equalizing valve 36 into the top half of tower 34, some gas from the bottom half of tower 32 flows into the bottom half of tower 34. The rest of the gas is dumped. However, the tower pressure is reduced only to about ambient pressure (in the high pressure PSA mode), which means that just prior to pressure equalization atmospheric pressure gas (enriched in oxygen) remains in the void space of the tower; void space may be about 40% of tower volume. The PSA adsorbent is believed to desorb an enriched in oxygen gas desorbate after the pressure has been reduced by the decompression surge outflow. Absent the nitrogen purge it is oxygen enriched gas which remains in the PSA tower and upon pressure equalization, gas flow tower top to tower top, tower bottom to tower bottom reverses the gas position, so that void gas which had been at the bottom of tower 32 and at the top of tower 32 is quickly translocated to somewhere near the midpoint of tower 34 as a slug of oxygen enriched air.

Bleed flow of nitrogen gas into the top of the PSA tower undergoing regeneration displaces and forces out through the bottom of the bed the tower void gas. It is believed that considerable oxygen enriched air is displaced from the tower by the purge of bleed nitrogen, oxygen enriched air that otherwise would remain in the tower for separation during the next adsorbent cycle, reducing capacity of the adsorbent. The about 15% efficiency improvement obtained by employment of the purge and increase in yield from 24% to more than 25% supports such belief.

According to the data obtained by the inventors hereof, a nitrogen purge flow of about 15 vol/vol of carbon molecular sieve per hour results in the combination of highest yield and efficiency. At a one minute PSA cycle time, this purge flow which amounts to ½ volume of nitrogen per volume of adsorbent per regeneration cycle, is estimated as being only about enough nitrogen to displace gas that otherwise would remain in the voids of the carbon molecular sieve in the PSA tower. The data on FIG. 3 to the right side of the peak on the yield curve indicates that increasing purge flow beyond the flow for peak yield results progressively in loss of yield, likely through discharge of relatively pure nitrogen from the tower as purged gas. Any and all of the nitrogen bleed that remains in the void space of the adsorbent is recovered since such gas will be forced into the middle of the tower region by subsequent pressure equalization, and then will be treated by the adsorbent and discharged as nitrogen offtake during the next adsorption cycle.

To exemplify the invention with further details of the preferred embodiment thereof constructed according to the flow sheet illustrated in FIG. 1 it is noted that the full scale test unit was a 2000 scf/hr. system that comprised 20" diameter PSA towers, (L:D=6.0 to 1) each charged with 750 lbs. of (Bergbau-Forschung) carbon molecular sieve, and a "75PS" dryer (Kemp Mfg. Co.) modified as already described to use dump gas desorbate and purged gas for desiccant regeneration, and a standard compressor that delivered 8000 scf/hr. at 8 bar. The nitrogen product 99.5% nitrogen plus argon of 2000 scf/hr. left the PSA towers at about 7 bar; purged gas and dump gases left the system at about atmospheric pressure (1 bar).

The test data graphed as FIGS. 2 and 3 were obtained on a complete small scale test unit with 2 ft.$^3$ of carbon in the towers and then validated on the full scale unit.

What is claimed is:

1. In a process for generating high purity nitrogen from compressed air by a pressure swing multi-tower adsorption system operated through successive adsorption and desorption cycles the improvements which comprise purging the tower undergoing desorption with from 5-30% of the high purity nitrogen offtake from the tower producing nitrogen through adsorption and drying the compressed air in a pressure swing solid desiccant twin tower air dryer, employing oxygen enriched gas effluent from desorption of the multi-tower adsorption system at ambient pressures for desiccant regeneration purposes in the twin tower air dryer.

2. The process of claim 1 wherein the air entering the process is compressed to about 100 psig.

3. In an apparatus for producing high purity nitrogen including a pressure swing multi-tower adsorption system with a length to diameter ratio of the towers in said adsorption system from 3.5:1 to 10:1, operated through successive adsorption and desorption cycles and a source of compressed air therefor, the improvements which comprise:

a cross-connection bleed line between the towers of said adsorption system adapted to pass from 5-30% of the high purity nitrogen leaving the tower producing nitrogen through adsorption into the top of the tower undergoing desorption; and a twin tower pressure swing solid desiccant air dryer between the compressed air source and said multi-tower adsorption system connected so as to feed dried compressed air to said multi-tower adsorption system for recovery of high purity nitrogen therefrom, and to receive ambient pressure oxygen enriched gas effluent therefrom for regenerating the desiccant in the air dryer.

4. The apparatus of claim 3 including manifolding at the desorption gas outlet from the multi-tower adsorption system adapted to pass gas effluent amounting to from 15-25% of the compressed air to said dryer for regenerating the desiccant therein and for dumping the balance of the desorption gases.

* * * * *